United States Patent
Mullin et al.

(10) Patent No.: US 9,419,463 B2
(45) Date of Patent: Aug. 16, 2016

(54) THIN FILM MICROBATTERY CHARGE AND OUTPUT CONTROL

(71) Applicant: CYMBET Corporation, Elk River, MN (US)

(72) Inventors: Jeffrey D. Mullin, Elk River, MN (US); Jeffrey S. Sather, Independence, MN (US)

(73) Assignee: CYMBET CORPORATION, Elk River, MN (US)

( * ) Notice: Subject to any disclaimer, the term of this patent is extended or adjusted under 35 U.S.C. 154(b) by 574 days.

(21) Appl. No.: 13/688,986

(22) Filed: Nov. 29, 2012

(65) Prior Publication Data

US 2014/0145680 A1    May 29, 2014

(51) Int. Cl.
*H02J 7/00* (2006.01)

(52) U.S. Cl.
CPC ............. *H02J 7/0091* (2013.01); *H02J 7/007* (2013.01)

(58) Field of Classification Search
CPC ..................................................... H02J 7/0031
USPC .......................................... 320/134, 135, 136
See application file for complete search history.

(56) References Cited

U.S. PATENT DOCUMENTS

| | | | |
|---|---|---|---|
| 2,427,729 A * | 9/1947 | Jenkins | 320/125 |
| 3,505,590 A * | 4/1970 | Thompson | 323/281 |
| 5,314,765 A | 5/1994 | Bates | |
| 5,338,625 A | 8/1994 | Bates et al. | |
| 5,445,906 A | 8/1995 | Hobson et al. | |
| 5,512,147 A | 4/1996 | Bates et al. | |
| 5,561,004 A | 10/1996 | Bates et al. | |
| 5,567,210 A | 10/1996 | Bates et al. | |
| 5,569,520 A | 10/1996 | Bates | |
| 5,597,660 A | 1/1997 | Bates | |
| 5,612,152 A | 3/1997 | Bates | |
| 5,654,084 A | 8/1997 | Egert | |
| 5,705,293 A | 1/1998 | Hobson | |
| 6,197,450 B1 | 3/2001 | Nathan et al. | |

(Continued)

FOREIGN PATENT DOCUMENTS

| | | |
|---|---|---|
| JP | 2007-508675 | 4/2007 |
| KR | 10-2002-0051844 | 6/2002 |

OTHER PUBLICATIONS

PCT International Search Report, International Application No. PCT/US2013/072215, mailed Mar. 18, 2014.

*Primary Examiner* — Drew A Dunn
*Assistant Examiner* — Jerry D Robbins
(74) *Attorney, Agent, or Firm* — Kagan Binder, PLLC

(57) ABSTRACT

A control system for charge and output control of a rechargeable thin film microbattery cell comprises a charge control logic component configured to control the level of charge of a thin film microbattery cell, a battery cut-off logic component to cease current draw on the thin battery thin film microbattery cell under predetermined conditions, a mode control logic component operably coupled to the charge control logic component and the battery cut-off logic component to enable operation of the charge control logic component and the battery cut-off logic component under predetermined conditions, and a Switch Capacitor DC-DC Downconverter Component for delivery of voltage external to the system configured to reduce battery output voltage potential by a factor of at least 2:1. Systems operably connected to a rechargeable thin film microbattery cell and powered devices comprising the system and the microbattery cell are also described.

18 Claims, 6 Drawing Sheets

(56) References Cited

U.S. PATENT DOCUMENTS

| | | |
|---|---|---|
| 6,815,999 B2 | 11/2004 | Brani |
| 6,906,436 B2 | 6/2005 | Jenson et al. |
| 6,986,965 B2 | 1/2006 | Jenson et al. |
| 7,527,897 B2 | 5/2009 | Nathan et al. |
| 7,776,478 B2 | 8/2010 | Klaassen |
| 7,931,989 B2 | 4/2011 | Klaassen |
| 7,939,205 B2 | 5/2011 | Klaassen |
| 8,228,023 B2 | 7/2012 | Sather et al. |
| 2003/0006737 A1* | 1/2003 | LaFollette et al. ............ 320/137 |
| 2006/0132093 A1* | 6/2006 | Nguyen ........................ 320/132 |
| 2007/0012244 A1 | 1/2007 | Klaasen |
| 2007/0182362 A1* | 8/2007 | Trainor et al. ................ 320/101 |
| 2008/0158915 A1* | 7/2008 | Williams .................... 363/21.06 |
| 2009/0214899 A1 | 8/2009 | Shakespeare et al. |
| 2009/0251099 A1* | 10/2009 | Brantner et al. ............. 320/101 |
| 2009/0326624 A1* | 12/2009 | Melse ........................... 607/116 |
| 2010/0060231 A1* | 3/2010 | Trainor et al. ................ 320/103 |
| 2010/0225278 A1* | 9/2010 | Reefman et al. ............. 320/135 |
| 2011/0193515 A1* | 8/2011 | Wu et al. ....................... 320/101 |
| 2011/0279096 A1* | 11/2011 | Sonntag ........................ 320/166 |

\* cited by examiner

THIN FILM MICROBATTERY CHARGE AND OUTPUT CONTROL

FIELD OF THE INVENTION

This invention relates to the field of thin-film energy-storage devices, and more specifically to control of thin-film microbattery charge and output.

BACKGROUND OF THE INVENTION

Electronics have been incorporated into many portable devices such as computers, mobile phones, tracking systems, scanners, etc. One drawback to portable devices is the need to include the power supply with the device. Portable devices typically use batteries as power supplies. Batteries must have sufficient capacity to power the device for at least the length of time the device is in use. Sufficient battery capacity can result in a power supply that is quite heavy and/or large compared to the rest of the device. Accordingly, smaller and lighter batteries (i.e., power supplies) with sufficient energy storage are desired. Other energy storage devices, such as supercapacitors, and energy conversion devices, such as photovoltaics and fuel cells, are alternatives to batteries for use as power supplies in portable electronics and non-portable electrical applications.

One type of an energy-storage device is a solid-state, thin-film microbattery. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; and 5,705,293. U.S. Pat. No. 5,338,625 describes a thin-film battery, especially a thin-film microbattery, and a method for making same having application as a backup or first integrated power source for electronic devices. U.S. Pat. No. 5,445,906 describes a method and system for manufacturing a thin-film battery structure formed with the method that utilizes a plurality of deposition stations at which thin battery component films are built up in sequence upon a web-like substrate as the substrate is automatically moved through the stations.

There continues to be a need for devices and methods that facilitate provision of power supplies in small devices.

SUMMARY OF THE INVENTION

A control system is provided that controls both charge control and output control of a rechargeable thin film microbattery cell. The present system includes a charge control logic component configured to control the level of charge of a thin film microbattery cell. The charge control logic component thus protects and extends battery life. Additionally, a battery cut-off logic component is included to cease current draw on the thin battery thin film microbattery cell under predetermined conditions. A mode control logic component is operably coupled to the charge control logic component and the battery cut-off logic component to enable operation of the charge control logic component and the battery cut-off logic component under predetermined conditions.

A Switch Capacitor DC-DC Downconverter Component for delivery of voltage external to the system is configured to reduce battery output voltage potential by a factor of at least 2:1. This Switch Capacitor DC-DC Downconverter Component reduces output energy in an efficient manner to power low-power devices, so that the effective operation of the microbattery is at least twice as long. Use of downconverter technology in the present environment provides a threefold benefit. First, reduction of the voltage provides a $V^2/R$ multiplier advantage leading to significantly reduced power consumption by the load; second, operating at lower voltages leads to less waste of unused energy to operate low power devices such as real time clocks; and third, because the amount of current drawn from the microbattery is lower, less power loss is experienced through microbattery internal impedence. Additionally, because less current is drawn from the microbattery, the operation temperature of the microbattery is expanded. A microbattery at lower temperature exhibits higher impedance than the same microbattery at a higher temperature. Because the present system permits operation of the same devices with less current, the microbattery's effective temperature range is expanded to include efficient operation at lower temperatures. Similarly, as a microbattery is exposed to multiple cycles, the level of impedence of the microbattery increases. Because the present system permits operation of the same devices with less current, microbatteries controlled by the present system require fewer cycles to do the same amount of work, increasing the life of the microbattery.

The combination of all four of the above components in a single system provides a highly efficient control that results in superior reliability and functionality of rechargeable thin film microbattery cells as compared to like cells that are not provided with the charge control and output control provided herein.

In an embodiment, all four of the above discussed components are located on a single integrated circuit. In an embodiment, the system is provided with a thin film microbattery as a unitary package.

In a preferred embodiment, the charge control logic is configured to reduce the voltage of the thin film microbattery when the ambient temperature of the system exceeds a predetermined value.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION OF PRESENTLY PREFERRED EMBODIMENTS

Figure 1:
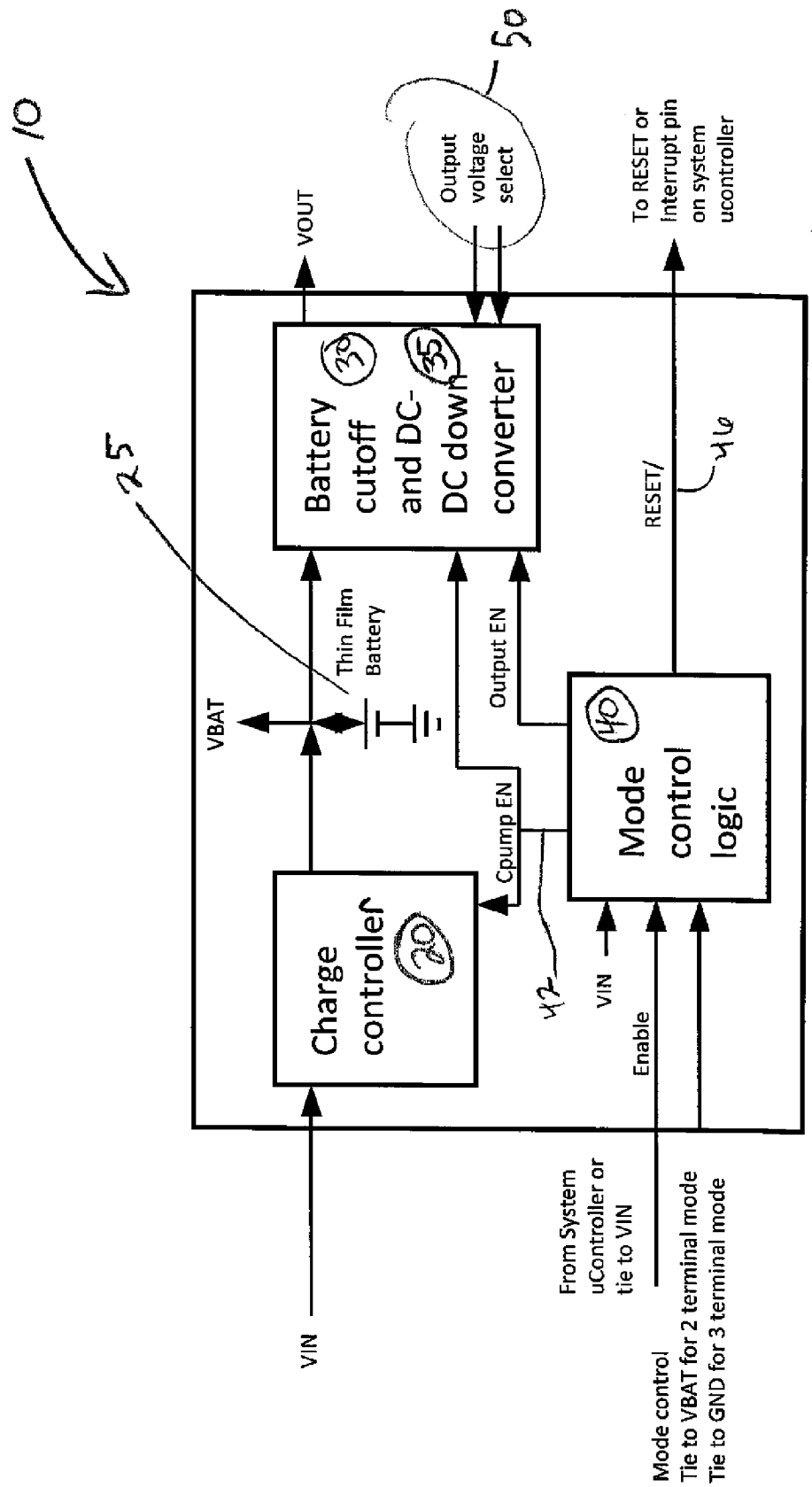
FIG. 1 is a diagram showing general architecture of an embodiment of a control system for charge and output control of the present invention.

It is to be understood that a device and method in accordance with the present invention includes, but is not limited to, novel combinations of conventional components, and not just particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

For purposes of the present invention, a thin film microbattery cell is a microbattery cell having dimensions not exceeding a longest dimension of 60 mm, more preferably not exceeding 20 mm, and has a thickness measured from the respective interior surfaces of the anode and cathode current collectors not exceeding 50 microns. Additionally, each individual microbattery cell has an effective capacity of no greater than about 500 μAH. It has been discovered that low power capacity rechargeable thin film microbatteries having both charge control and output control as provided herein exhibit excellent long term performance and can provide power for application environments not previously achievable in a reliable manner.

In an embodiment of the present invention, each individual microbattery cell has an effective capacity of from about 500 μAH to about 1 μAH. In an embodiment of the present invention, each individual microbattery cell has an effective capacity of from about 500 μAH to about 200 μAH. In an embodiment of the present invention, each individual microbattery cell has an effective capacity of from about 200 μAH to about 50 μAH. In an embodiment of the present invention, each individual microbattery, cell has an effective capacity of from about 50 μAH to about 25 μAH. In an embodiment of the present invention, each individual microbattery cell has an effective capacity of no greater than about 25 μAH. In an embodiment of the present invention, each individual microbattery cell has an effective capacity of from about 25 μAH to about 1 μAH. Each of the above noted microbattery capacity ranges defines a unique power delivery capability that provides advantage in the powering of devices having a corresponding power consumption. Such devices have not previously been provided with a battery power source that is a thin film rechargeable microbattery having performance characteristics as afforded by the present system.

As used herein, the term "microbattery cell" includes microbattery cell assemblies that are functional, and additionally microbattery cells that are not yet functional, but which will be functional upon application of an initial charge.

In a preferred embodiment, the microbattery cell is a solid state cell, meaning that it does not contain discrete components that flow as a liquid. Solid state components may comprise, for example, polymer electrolytes wherein the polymer is combined with a solvent to provide appropriate ion transfer properties. However, the solvent associated with the polymer is not present in quantities that permit flow of the solvent from the battery cell in the event of physical compromise of the battery. The solid state thin film microbattery is advantageous because it is particularly robust and durable, and may be used in applications where it may be exposed to physical abuse and temperature challenges.

FIG. 1 shows the general architecture of a control system 10 for charge and output control of a rechargeable thin film microbattery cell. The control system 10 comprises a charge control logic component 20 configured to control the level of charge of a thin film microbattery cell 25. Charge control logic 20 measures and controls the input voltage to be applied to thin film microbattery cell 25 according to predetermined values or by values set by external interface. For example, the input voltage to be applied to thin film microbattery cell 25 may be set at 4.1 V, and may alternatively be set at a higher or lower potential by an eternal interface (not shown). Specific architecture of an embodiment for charge control logic component 20 is shown in more detail in FIG. 2. Battery cut-off logic component 30 is operated to cease current draw on the thin battery thin film microbattery cell 25 under predetermined conditions. Specific architecture of an embodiment for battery cut-off logic component 30 is shown in more detail in FIG. 3. Mode control logic component 40 is operably coupled to the charge control logic component 20 and the battery cut-off logic component 30 to enable operation of the charge control logic component and the battery cut-off logic component under predetermined conditions. Mode Control logic component 40 determines if the external power source has been disconnected so the device is operating on battery power, whether the battery is in need or charging, and whether the battery should be cut off as a power source to the device when operating in two terminal mode. Upon restoration of external power, Mode Control logic component 40 restarts battery charge operations via charge pump enabler signal line 42 by turning on Charge Controller 20. An edge control signal is additionally provided by charge pump enabler signal line 42 to battery cut-off 30, so that thin film microbattery cell 25 can be connected to a load. Optionally, Mode Control logic component 40 is provided with reset line 46, which provides a signal to external components to inform that the system is in charging mode, and is not running off of backup battery power. Specific architecture of an embodiment of mode control logic component 40 is shown in more detail in FIG. 4. Switch Capacitor DC-DC Downconverter Component 35 is configured to reduce battery output voltage potential by a factor of at least 2:1. The output voltage may be pre-set, or may optionally be selected using an external interface 50. Specific architecture of an embodiment of Switch Capacitor DC-DC Downconverter Component 35 is shown in more detail in FIG. 3.

In an embodiment of the present invention, thin film microbattery cell 25 is provided as a component that is physically separate from control components of the system. In a preferred embodiment, the control components of the system are provided in a single integrated circuit that can be manufactured and/or sold separate from the thin film microbattery cell. The system may be thus supplied to a hardware manufacture that will electrically connect the battery to the control system to provide a unitary battery/control system for subsequent incorporation in a device, or may incorporate the separate battery and control system simultaneously or sequentially in the device.

Figure 2:
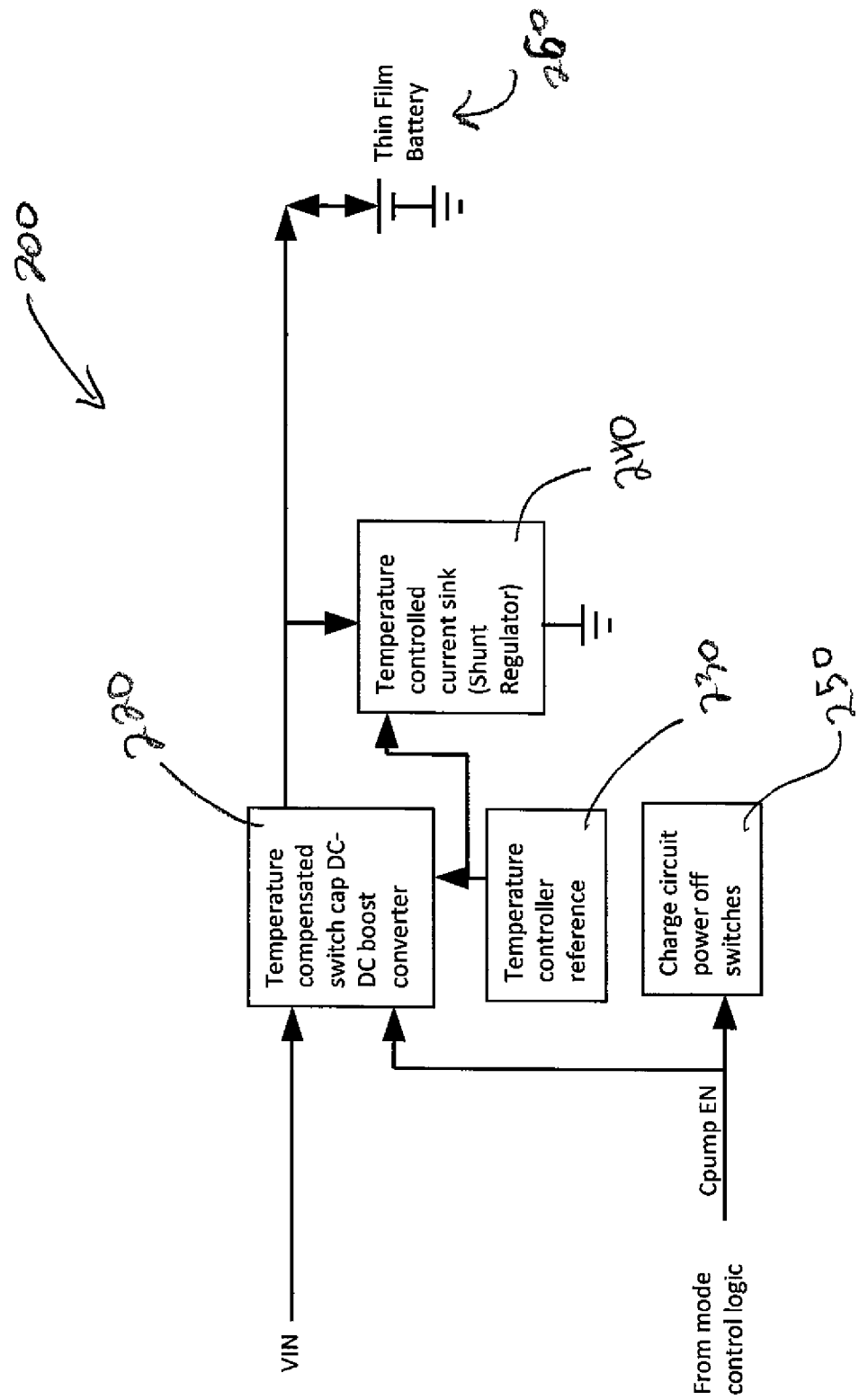
FIG. 2 is a diagram showing architecture of an embodiment of charge control logic of the present invention.

FIG. 2 shows an embodiment of charge control logic architecture whereby a charge controller component 200 comprises a temperature compensated switch cap DC-DC boost converter 220 that operates as a charge pump to elevate voltage to a desired level. In an embodiment, the switch cap DC-DC boost converter 220 may be located external to the integrated circuit in which other components of the control system of the present invention reside. In preferred embodiment, the switch cap DC-DC boost converter 220 is located on the same integrated circuit in which other components of the control system of the present invention reside. In an alternative embodiment, the charge pump function is instead provided by an inductive boost converter that is located on a separate circuit. However, use of a switch cap DC-DC boost converter as the charge pump is preferred for space and economic reasons. The switch cap DC-DC boost converter 220 is operably connected to a temperature controller reference 230, which measures the ambient temperature of the temperature controller reference 230 and provides information to switch cap DC-DC boost converter 220 so that the level of the voltage provided to the thin film battery 260 is temperature compensated according to predetermined criteria. It will be understood that the temperature controller reference 230 may be configured to measure the actual temperature of the battery, or may be indexed to predict the temperature of the battery in the event that the temperatures are not identical. It has been found that the efficiency and life expectancy of thin film batteries can be maximized by optimizing the relationship of charge potential to temperature. Thus, certain thin film solid state batteries are preferably charged to a potential of 4.1 V at 23 degrees C. As batteries are heated, the potential of the battery should be reduced for optimal efficiency and life expectancy. In an embodiment of the invention, the voltage of the thin film microbattery is reduced according to an algorithm of about 2 to 2.5 mV per degrees C. above 23 degrees. In a preferred embodiment, charge controller component 200 comprises a temperature controlled current sink 240, such as a shunt regulator. In the event that a battery is fully charged, and temperature controller reference 230 detects that the temperature has increased above the desired level for the battery as charged, temperature controller reference 230 sends a signal to engage temperature controlled current sink 240, thereby drawing off energy and reducing the potential of the battery to the desired level for the ambient temperature of the battery. Charge controller component 200 additionally optionally comprises charge circuit power off switches 250 that permit the charge pump to be eternally shut off so that the battery is not continuously biased or charged, and additionally may be cycled to improve overall battery life.

Figure 3:
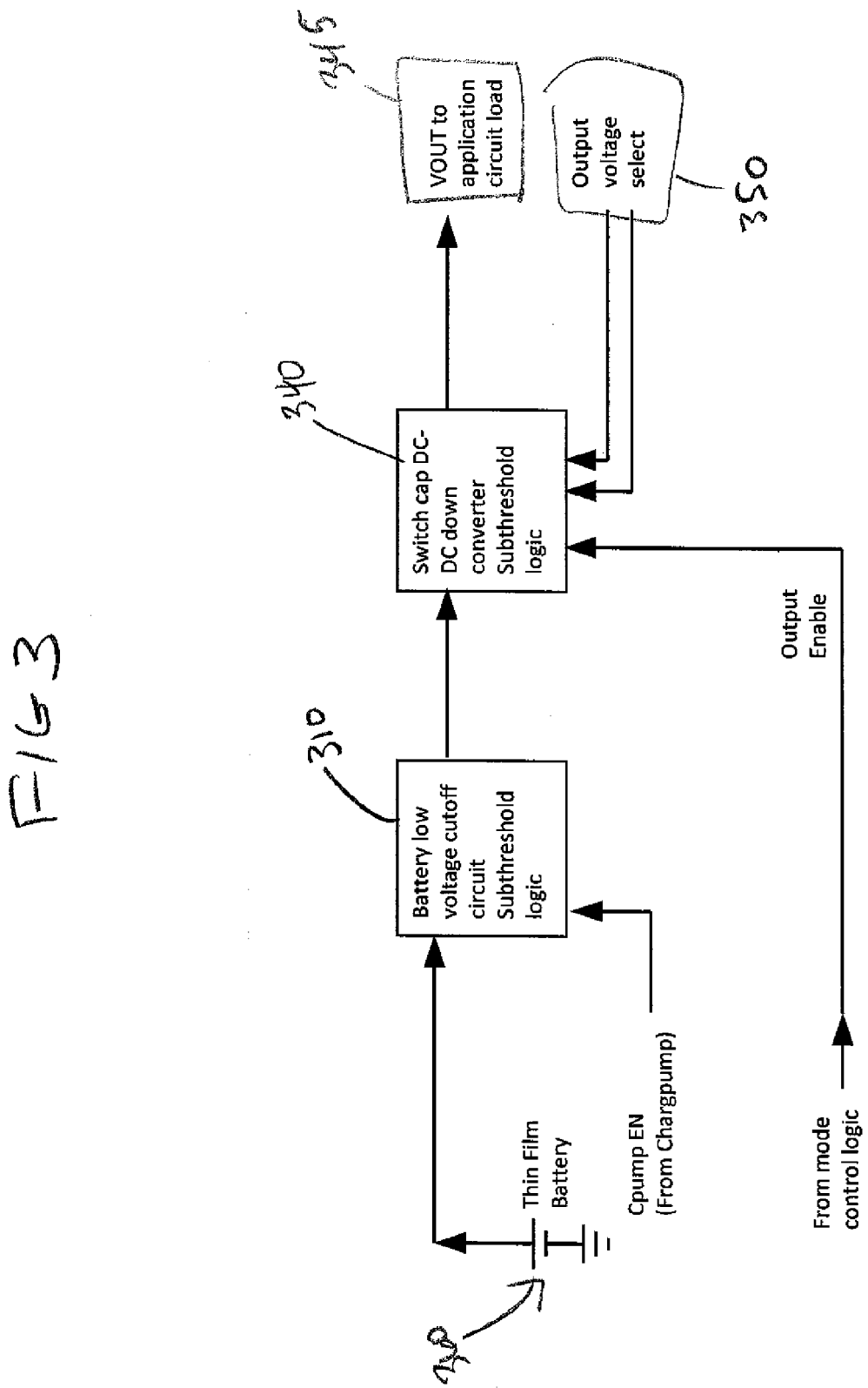
FIG. 3 is a diagram showing architecture of an embodiment of battery low voltage cut-off and Switch Capacity DC-DC downconverter components of the present invention.

FIG. 3 shows an embodiment of the present invention particularly discussing details of components that are downstream from thin film microbattery cell 360. Specifically, battery cut-off logic component 310 determines the remaining voltage in the battery when the device is operating (and therefore depleting) battery power, and ceases the draw of current from the thin battery thin film microbattery cell 360 under predetermined conditions. Examples of predetermined conditions for activation of the battery low voltage cutoff include when the battery potential is below a predetermined threshold ("cutoff threshold"), such as 3V. In an embodiment, the cutoff threshold is selected from a value between 2.5 and 3.5V, or in another embodiment the cutoff threshold is selected from a value between from 2.8 to 3.2V. The cutoff threshold can be any value, such as 2.5, 2.6, 2.7, 2.8, 2.9, 3.0, 3.1, 3.2, 3.3, 3.4 or 3.5V. Voltage of the microbattery cell may be measured using conventional voltage measurement techniques as will now be apparent to the skilled person in the art, such as by use of A/D converters or a D to A converter in conjunction with a comparator, or other appropriate systems. In an embodiment, the potential of the battery is measured using edge detection logic. In another embodiment, battery cut-off logic component 310 is activated to cut off the battery from the device in the event that an excessive load on the battery is detected, such as a momentary short circuit by for example a loose screw or overheated part.

As noted in FIG. 3, battery cut-off logic component 310 optionally utilizes logic circuitry that operates at sub-threshold voltage levels to carry out battery voltage sampling operations and cut-off functionalities of this component. For purposes of the present invention, "sub-threshold voltage" is a potential that is below the threshold potential for operation of transistors. Operation of the logic circuitry at sub-threshold voltage levels allows the circuits to operate at nano or pico-amp current levels, rather than unnecessarily drawing larger amounts of current from the microbattery. In an embodiment of the present invention, battery cut-off logic component 310 comprises a switch capacitor DC-DC downconverter array to reduce the voltage potential being used by internal circuits of battery cut-off logic component 310 to a level of from about 10 to about 700 millivolts. In an embodiment of the present invention, battery cut-off logic component 310 comprises a switch capacitor DC-DC downconverter array to reduce the voltage potential being used by internal circuits of battery cut-off logic component 310 to a level of from about 100 to about 500 millivolts. In an embodiment of the present invention, battery cut-off logic component 310 comprises a switch capacitor DC-DC downconverter array to reduce the voltage potential being used by internal circuits of battery cut-off logic component 310 to a level of from about 300 to about 400 millivolts.

When the external power is restored, the charge controller 20 (as shown in FIG. 1) and, battery cut-off logic component 310 are restarted.

In an embodiment, Switch Capacitor DC-DC Downconverter Component 340 advantageously converts voltage to be delivered to operate devices that are external to the system from a higher voltage to lower voltage using capacitor switching elements, rather than linear low dropout systems that reduce voltage through heat generating resistance components. By use of a switch capacitor system, energy is converted in a more efficient manner, all components may be integrated on a single integrated circuit, and the overall system is more robust because sensitive electronic components are not exposed to heat generated by less efficient voltage conversion systems. Additionally, devices downstream from the Switch Capacitor DC-DC Downconverter Component are more reliable and function for a longer time (greater life expectancy) because of superior performance when operated at reduced voltage. In a preferred embodiment, the system comprises voltage reducing components that do not comprise a linear regulator.

In an embodiment, the Switch Capacitor DC-DC Downconverter Component for delivery of voltage external to the system reduces the voltage potential by an integer ratio of from 2:1 to 5:1, and for example integer ratios such as 2:1, 3:1, 3:2, 4:1, or 5:1. In an embodiment, the Switch Capacitor DC-DC Downconverter Component for delivery of voltage external to the system reduces the voltage potential to from about 0.3V to about 3.3V. Downconversion of the voltage delivered by the system to an external load in this manner significantly extends the life of the battery, making a battery having a capacity of for example, 5 μAh perform like a battery having a capacity of 10 or 15 μAh using conventional control technology.

In an embodiment, the system is provided with a Switch Capacitor DC-DC Downconverter Component for delivery of an external voltage potential at a level of from about 10 to about 700 millivolts. In another embodiment, system is provided with a Switch Capacitor DC-DC Downconverter Component for delivery of an external voltage potential at a level of from about 100 to about 500 millivolts. In another embodiment, system is provided with a Switch Capacitor DC-DC Downconverter Component for delivery of an external voltage potential at a level of from about 300 to about 400 millivolts.

The value of voltage reduction may be set by choice of capacitor ratios and arrangement, or may optionally also be selectable by an output voltage selector interface 350.

In an embodiment, Switch Capacitor DC-DC Downconverter Component 340 optionally utilizes logic circuitry that operates at sub-threshold voltage levels to carry out the internal downconverter control functionalities associated with this component. In this embodiment, Switch Capacitor DC-DC Downconverter Component 340 comprises two downconverter arrays, a first for downconverting voltage to be delivered to an external load as discussed above and a second for downconverting voltage to be delivered to internal operation circuitry at sub-threshold logic levels. In one embodiment, the second switch capacitor DC-DC downconverter array reduces the voltage potential being used by internal circuits of Switch Capacitor DC-DC Downconverter Component 340 to a level of from about 10 to about 700 millivolts. In an embodiment of the present invention, Switch Capacitor DC-DC Downconverter Component 340 comprises a switch capacitor DC-DC downconverter array to reduce the voltage potential being used by internal circuits of Switch Capacitor DC-DC Downconverter Component 340 to a level of from about 100 to about 500 millivolts. In an embodiment of the present invention, Switch Capacitor DC-DC Downconverter Component 340 comprises a switch capacitor DC-DC downconverter array to reduce the voltage potential being used by internal circuits of Switch Capacitor DC-DC Downconverter Component 340 to a level of from about 300 to about 400 millivolts.

In an embodiment of the present invention, battery cut-off logic component 310 comprises a circuit configuration to limit leakage currents to a value not exceeding about 30 picoamps. In an embodiment, the circuit configuration to limit leakage currents comprises at least two series-connected transistors that provide a selectively enabled electrical connection between the thin film microbattery cell 360 and the battery cut-off logic component 310. Such circuit configuration to limit leakage currents are additionally described in U.S. Pat. No. 8,228,023, which issued on Jul. 24, 2012, the disclosure of which is incorporated herein by reference.

Figure 4:
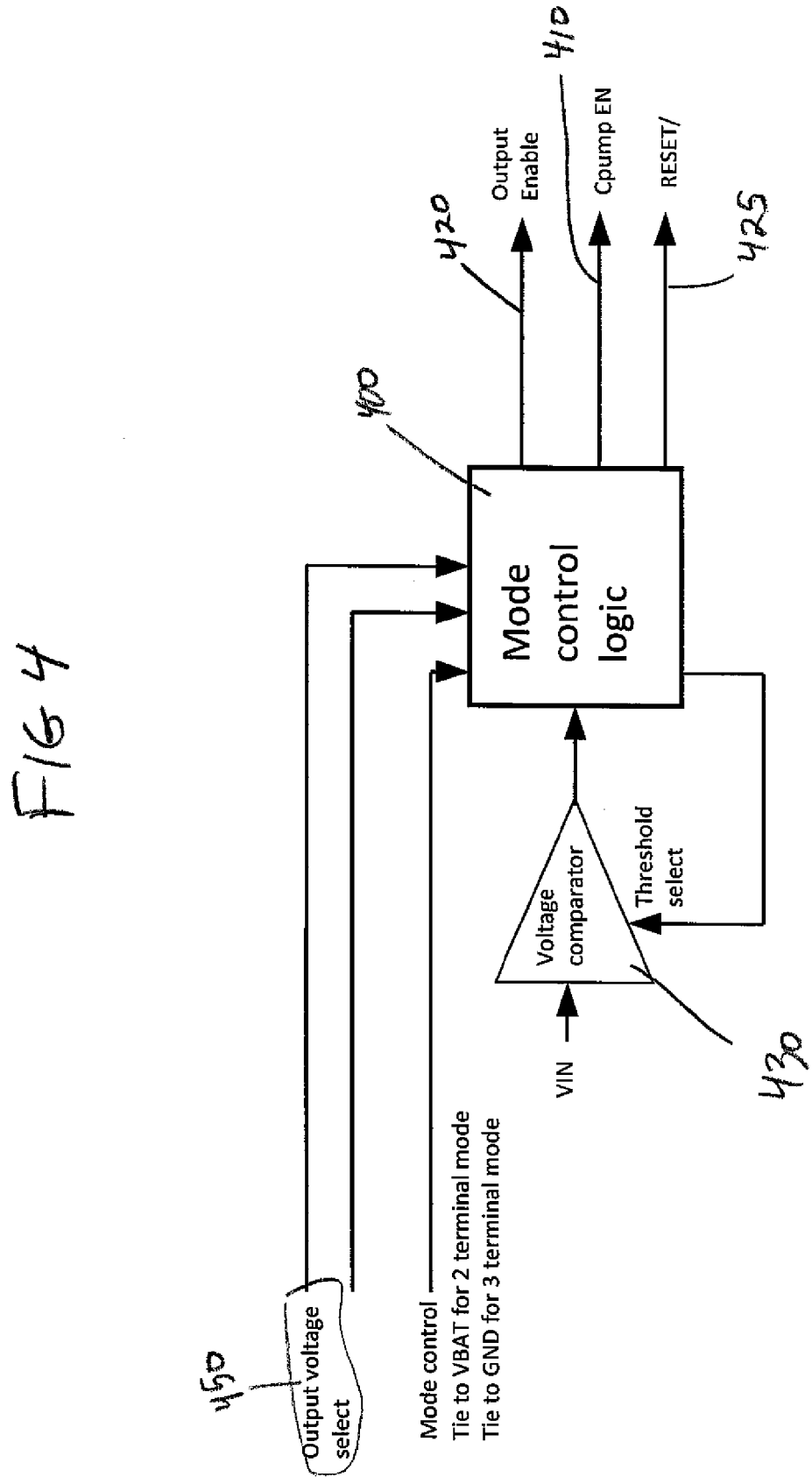
FIG. 4 is a diagram showing architecture of an embodiment of mode control logic component of the present invention.
Figure 6:
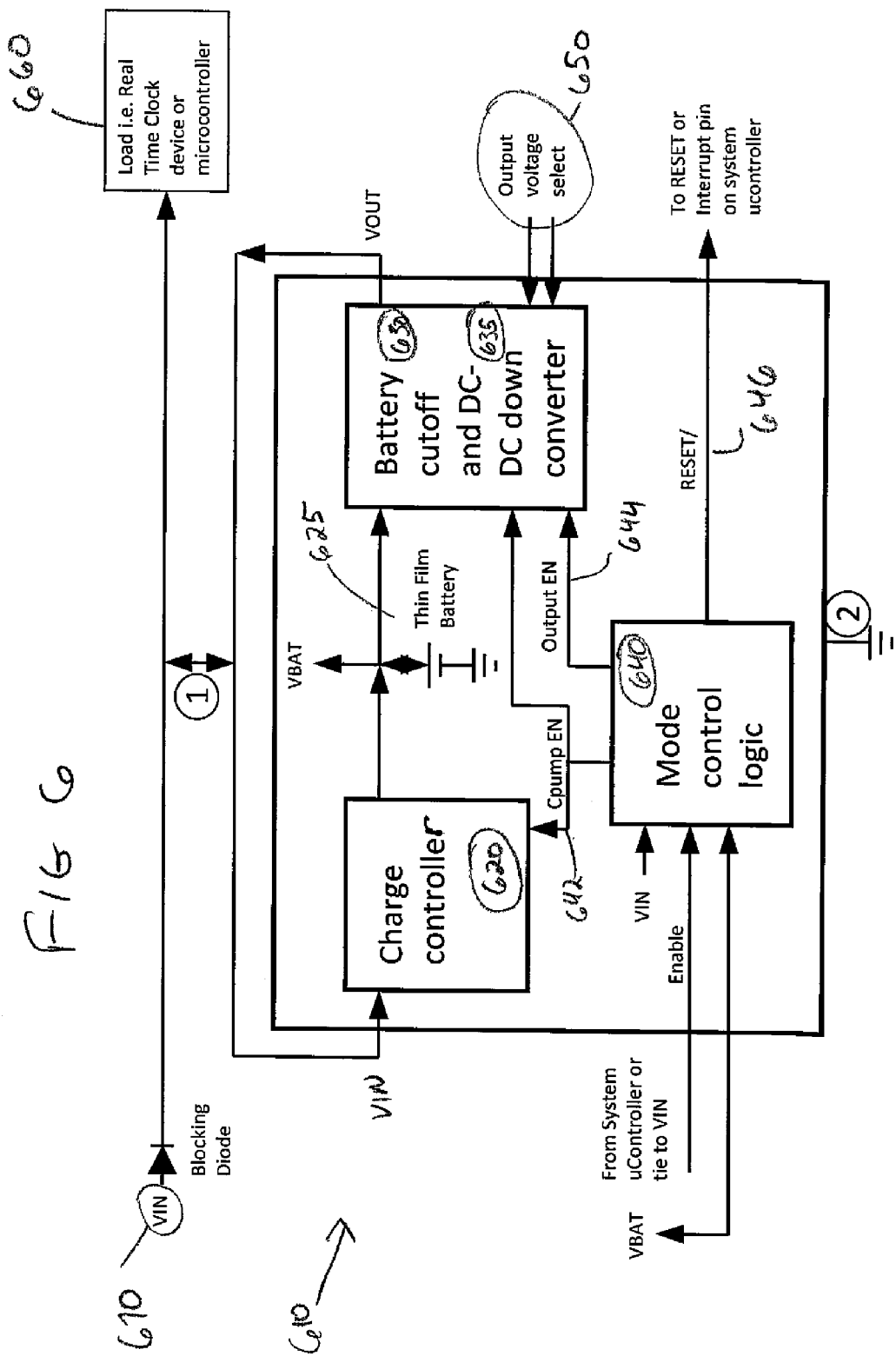
FIG. 6 is a diagram showing general architecture of a two terminal embodiment of a control system for charge and output control of the present invention.

Low capacity thin film microbattery cells present particular challenges in providing power over long periods of time. In an embodiment of the present invention, the charge control and output control system is preferably configured to minimize power loss through quiescent drains (i.e. drains on battery caused just by monitoring the system using internal circuits while the external power source is disconnected) and power leakage. In one embodiment, all internal circuits of the system for monitoring charge control and output control for operation when the system is disconnected from external power are sub-threshold logic circuits. In another embodiment, all internal circuits of the system for monitoring charge control and output control for operation when the system is disconnected from external power are configured to limit leakage currents to a value not exceeding about 30 picoamps, and more preferably not exceeding about 10 picoamps. In another embodiment, all internal circuits of the system for monitoring charge control and output control for operation when the system is disconnected from external power are sub-threshold logic circuits and additionally are configured to limit leakage currents to a value not exceeding about 30 picoamps, and more preferably not exceeding about 10 picoamps FIG. 4 shows mode control logic component 400 operably coupled to the charge control logic component via Cpump enable line 410 and the battery cut-off logic component by Output Enable line 420, to enable operation of the charge control logic component and the battery cut-off logic component under predetermined conditions. Voltage comparator 430 compares the voltage coming into the control system via VIN to determine if power is being supplied from an external source. If no power is being provided by the external source, Mode Control Logic 400 converts the system to low power mode by turning off Cpump enable 410, thereby turning off the battery charging function. Referring back to FIG. 2, it is noteworthy that in an embodiment of the invention, temperature controller reference 230 and temperature controlled current sink 240 are not shut off by off Cpump enable 410, because it may still be necessary to remove current from the battery even when not in charge mode in the event that the battery temperature increases to a level where the battery potential is too high for the preferred performance properties under the ambient conditions. Mode Control Logic 400 also sends a signal via RESET 425 to provide external indication that the battery is not charging. Mode Control Logic 400 also provides a signal to Switch Capacitor DC-DC down converter via output enable line 420 to disable the DC-DC down converter when input power is available when the system is provided in a two terminal configuration, as shown in FIG. 6.

Mode Control Logic 400 also may be provided with the ability to select the output voltage using output voltage select interface 450. The selection of the output voltage at output voltage select interface 450 (either by a user or by operation of an automated system) will affect the threshold level for turning on or off of output enable line 420 for operation of the DC-DC downconverter in response to the VIN potential in two-terminal mode (as discussed in FIG. 6.).

Figure 5:
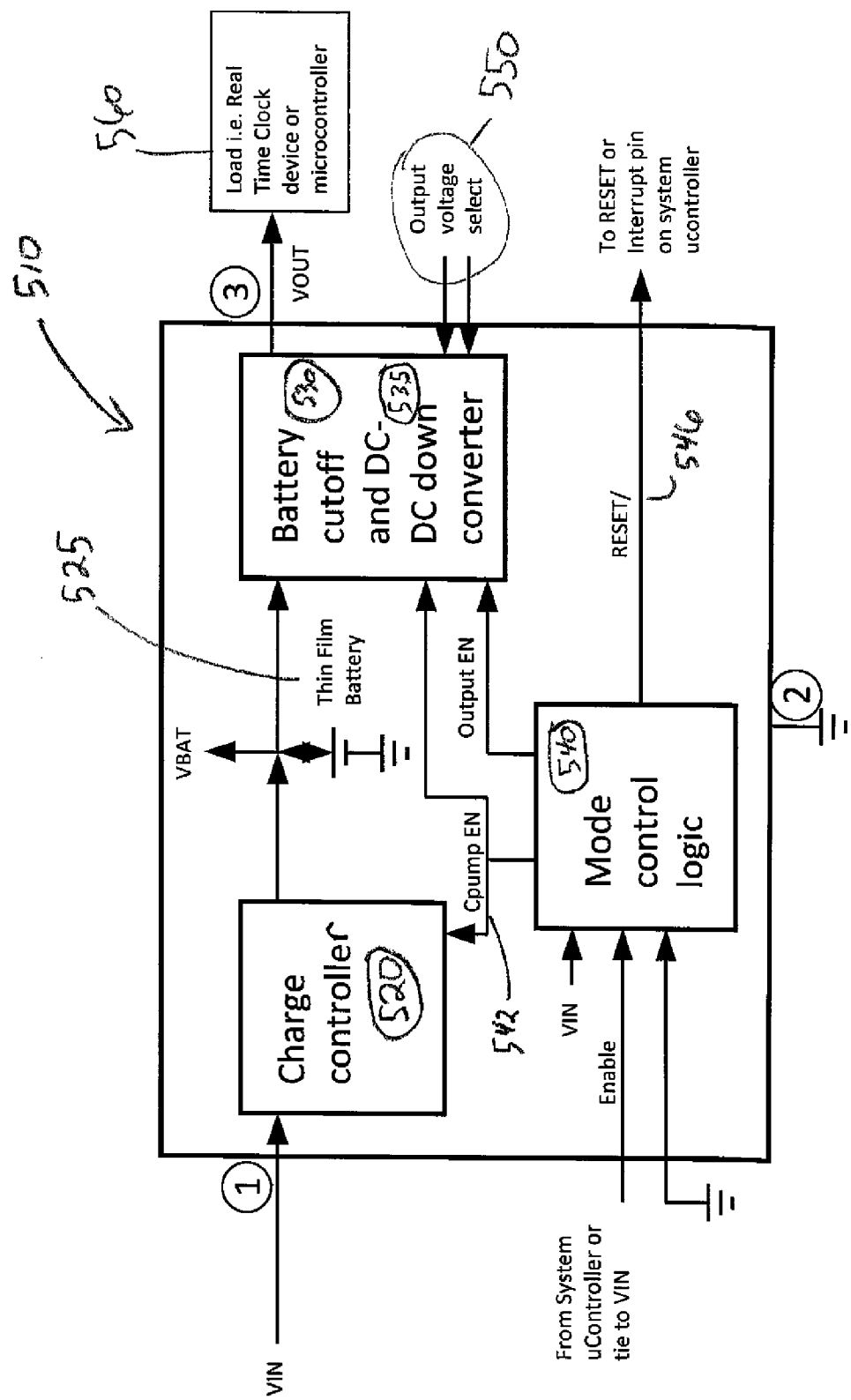
FIG. 5 is a diagram showing general architecture of a three terminal embodiment of a control system for charge and output control of the present invention.

FIG. 5 shows a three terminal device, wherein the system 510 including thin film microbattery cell 525 is connected to voltage input at 1, ground at 2 and voltage output to load at 3. As shown, the control system 510 comprises a charge control logic component 520 configured to control the level of charge of a thin film microbattery cell 525. Charge control logic 520 measures and controls the input voltage to be applied to thin film microbattery cell 525 according to predetermined values or by values set by external interface. Battery cut-off logic component 530 is operated to cease current draw on the thin battery thin film microbattery cell 525 under predetermined conditions. Mode control logic component 540 is operably coupled to the charge control logic component 520 and the battery cut-off logic component 530 to enable operation of the charge control logic component and the battery cut-off logic component under predetermined conditions. Mode Control logic component 540 determines if the external power source has been disconnected so the device is operating on battery power, whether the battery is in need or charging, and whether the battery should be cut off as a power source to the device to protect the battery for any reason. Upon restoration of external power, Mode Control logic component 540 restarts battery charge operations via charge pump enabler signal line 542. Optionally, Mode Control logic component 540 is provided with reset line 546, which provides a signal to external components to inform that the system is in charging mode, and is not running off of backup battery power. Switch Capacitor DC-DC Downconverter Component 535 is configured to reduce battery output voltage potential by a factor of at least 2:1 and deliver power to device 560. The output voltage may be pre-set, or may optionally be selected using an external interface 550. Three terminal system 510 is preferably used in applications wherein one of the desired features is an in-line reduction of voltage delivered to the load. It will be understood that the foregoing is a summary of the configuration of system 510, and that details and optional aspects of the various components described in association with FIGS. 2-4 may be incorporated individually or in combination in the design of system 510.

In an embodiment of the present invention, thin film microbattery cell 525 is provided as a component that is physically separate from control components of the system (i.e on a separate physical platform) that may be later assembled and electrically connected to the charge and input control components as described herein. In another embodiment of the present invention, thin film microbattery cell 525 is provided as a component that is physically and electrically connected with control components of the system (i.e., on a single physical platform) that may be supplied to a device manufacturer as a unitary assembly and plug-in incorporation into the device by the device manufacturer.

FIG. 6 shows a two terminal device wherein the control system 610 is configured to provide auxiliary power to a device 660 without being an intermediate link between the power source 601 and device 660. System 610 is connected to the external power source at connection 1, and is grounded at ground 2.

System 610 comprises a charge control logic component 620 configured to control the level of charge of a thin film microbattery cell 525. Charge control logic 620 measures and controls the input voltage to be applied to thin film microbattery cell 625 according to predetermined values or by values set by external interface. Battery cut-off logic component 630 is operated to cease current draw on the thin battery thin film microbattery cell 625 under predetermined conditions. Mode control logic component 640 is operably coupled to the charge control logic component 620 and the battery cut-off logic component 630 to enable operation of the charge control logic component and the battery cut-off logic component under predetermined conditions. Mode Control logic component 640 determines if the external power source has been disconnected so the device is operating on battery power, whether the battery is in need of charging, and whether the battery should be cut off as a power source to the device to protect the battery for any reason. Upon restoration of external power, Mode Control logic component 640 restarts battery charge operations via charge pump enabler signal line 642. Optionally, Mode Control logic component 640 is provided with reset line 646, which provides a signal to external components to inform that the system is in charging mode, and is not running off of backup battery power. Switch Capacitor DC-DC Downconverter Component 635 is configured to reduce battery output voltage potential by a factor of at least 2:1 and deliver power to device 660. The output voltage may be pre-set, or may optionally be selected using an external interface 650. It will be understood that the foregoing is a summary of the configuration of system 610, and that details and optional aspects of the various components described in association with FIGS. 2-4 may be incorporated individually or in combination in the design of system 610.

Because the control system 610 is a two terminal device, the system can readily plugged into circuit arrays in the same manner as capacitors or batteries. Advantageously, the system in combination with a thin film microbattery cell 625 provides an off-the-shelf device that can be inserted without concern as to design components of the balance of the product developed by device manufacturers to conveniently meet their backup power needs.

In operation, power from external power source 670 is provide directly to device 660. While external power is available, energy is also provide to charge controller 620 for charging the battery as needed through operation of the mode control logic (including optionally providing external charge termination signals) as discussed above.

When external power is lost, the charge controller 620 is provided a signal from mode control logic 640 so that thin film microbattery cell 625 is not charged. Output enable 644 is activated to operate the DC-DC downconverter 635, which provides power to device 660. Blocking diode 665 or a similar leak prevention component is operably connected to system 610 prevent leakage of current. In embodiments of the invention, blocking diode 665 or a similar leak prevention component is optionally located adjacent or in device 660. Device 660 is provided with power from the thin film microbattery cell 625 until external power is restored, or the microbattery is discharged below a predetermined threshold level or experiences an excessive load.

In the embodiment as shown in FIG. 6, the external DC-DC downconverter is not intermediate between external power source 610 and device 660. As shown, the device is provided with the full voltage of external power source 610 when external power is available, and only receives reduced voltage power when the device is operating on battery power.

In an embodiment of the present invention, thin film microbattery cell 625 is provided as a component that is physically separate from control components of the two terminal system (i.e., on a separate physical platform) that may be later assembled and electrically connected to the charge and input control components as described herein. In another embodiment of the present invention, thin film microbattery cell 625 is provided as a component that is physically and electrically connected with control components of the two terminal system (i.e., on a single physical platform) that may be supplied to a device manufacturer as a unitary assembly and plug-in incorporation into the device by the device manufacturer.

In an embodiment, the present system is connected with one or more downstream devices that are configured to operate at voltages of from about 0.3V to about 3.3V and the system is provided with a Switch Capacitor DC-DC Downconverter Component for delivery of an external voltage potential at a level of from about 0.3V to about 3.3V. In another embodiment, the present system is connected with one or more downstream devices that are configured to operate at sub-threshold voltages (i.e. below the threshold potential for operation of transistors) and the system is provided with a Switch Capacitor DC-DC Downconverter Component for delivery of an external voltage potential at sub-threshold levels.

Devices that are operated at voltages below the standard. 4-4.1V have been found to be particularly advantageous when used in combination with rechargeable thin film microbatteries, because electronic components operating at low voltage are exposed to less physical challenge, and the electronic components tend to have a longer life than like components operating at higher voltage. Preferably, the devices comprises functionalities such as a low power RTC, a sleep timer and for energy harvesting power conversion circuits.

The rechargeable thin film microbattery cells used in the present system may be configured in a variety of ways and manufactured using various materials as will now be appreciated by the skilled artisan. In an embodiment, the microbattery cell is provided in a fully charged state, or in a "pre-charged" state. An example of a microbattery cell in a pre-charged state is an assembly of microbattery cell components that does not contain a functional amount of metallic lithium anode, but which, when sufficiently charged, contains a functional metallic lithium anode. Thus, thin film microbatteries of the present invention may be an assembly of components that has never been charged, or that has been partially charged, but not sufficiently charged to contain metallic lithium in an amount sufficient to function as a practical microbattery (i.e. sufficient to power a component such as an ASIC for its intended operational cycle).

Thin film microbattery cells when fully charged comprise a cathode current collector, a cathode, an electrolyte, and anode and an anode current collector. The microbattery cell typically is manufactured on a substrate. In a preferred embodiment of the present invention, the thin film microbattery cell is initially constructed without an anode, but with a cathode layer that can act as a source of lithium ions. Upon charging of this thin film microbattery cell embodiment, metallic lithium is plated between the electrolyte and the anode current collector to form an anode. Alternatively, the anode may be formed by intercalation of the anode material in a layer receptive for forming and anode layer. For example, the cathode layer may be a material such as $LiCoO_2$ that can act as a source of lithium ions. Likewise, the thin film microbattery cell may be initially constructed without a cathode layer that is subsequently formed during charging. Examples of thin-film batteries are described in U.S. Pat. Nos. 5,314,765; 5,338,625; 5,445,906; 5,512,147; 5,561,004; 5,567,210; 5,569,520; 5,597,660; 5,612,152; 5,654,084; 5,705,293; 6,906,436; 6,986,965; 7,931,989; 7,776,478; and 7,939,205 and US Publication Nos. 2009/0214899 and 2007/0012244 each of which is herein incorporated by reference for all purposes, particularly with respect to the construction methodologies and materials selection of the microbattery cell components and embodiments of devices comprising thin film batteries.

All percentages and ratios used herein are weight percentages and ratios unless otherwise indicated. All patents, patent applications (including provisional applications), and publications cited herein are incorporated by reference as if individually incorporated for all purposes. Numerous characteristics and advantages of the invention meant to be described by this document have been set forth in the foregoing description. It is to be understood, however, that while particular forms or embodiments of the invention have been illustrated, various modifications, including modifications to shape, and arrangement of parts, and the like, can be made without departing from the spirit and scope of the invention.

What is claimed is:

1. A control system for charge and output control of a rechargeable thin film microbattery cell comprising
    a charge control logic component configured to control the level of charge of a thin film microbattery cell, wherein the charge control logic component comprises a charge pump unit, a temperature controller reference that measures the ambient temperature of the system, and a temperature controlled shunt regulator, wherein the charge control logic is programmed to reduce the voltage of the thin film microbattery when the ambient temperature of the system exceeds a predetermined value by operation of the temperature controlled shunt regulator,
    a battery cut-off logic component to cease current draw on the thin battery thin film microbattery cell under predetermined conditions,
    a mode control logic component operably coupled to the charge control logic component and the battery cut-off logic component to enable operation of the charge control logic component and the battery cut-off logic component under predetermined conditions, and
    a Switch Capacitor DC-DC Downconverter Component for delivery of voltage external to the system configured to reduce battery output voltage potential by a factor of at least 2:1.

2. The system of claim 1, wherein the charge pump unit of the charge control logic component is one of a switch capacitor DC-DC boost converter or an inductive boost converter.

3. The system of claim 1, wherein the predetermined value of the ambient temperature is about 23 degrees C. and the voltage of the thin film microbattery is reduced according to an algorithm of about 2 to 2.5 mV per degrees C. above 23 degrees.

4. The system of claim 1, wherein the battery cut-off logic component operates to disconnect the battery from a load when the battery voltage is reduced to a value at or below a predetermined minimum value.

5. The system of claim 4, wherein the predetermined minimum value is a value selected from 2.8 to 3.2 volts.

6. The system of claim 1, wherein the battery cut-off logic component comprises a switch capacitor DC-DC downconverter array to reduce the voltage potential being used by internal circuits of the battery cut-off logic component to a level of from about 10 to about 700 millivolts.

7. The system of claim 1, wherein the Switch Capacitor DC-DC Downconverter Component for delivery of voltage external to the system reduces the voltage potential by an integer ratio of from 2:1 to 5:1.

8. The system of claim 1, wherein the Switch Capacitor DC-DC Downconverter Component for delivery of voltage external to the system reduces the voltage potential to from about 0.3 V to about 3.3 V.

9. The system of claim 1, wherein the Switch Capacitor DC-DC Downconverter Component for delivery of voltage external to the system reduces the voltage potential to from 100 to 500 millivolts.

10. The system of claim 1, wherein the Switch Capacitor DC-DC Downconverter Component comprises a second switch capacitor DC-DC downconverter array to reduce the voltage potential being used by internal circuits of the battery cut-off logic component to a level of from about 10 to about 700 millivolts.

11. The system of claim 1, wherein the battery cut-off logic component comprises a circuit configuration to limit leakage currents to a value not exceeding about 30 picoamps.

12. The system of claim 1, wherein the system does not comprise a linear regulator.

13. The system of claim 1, wherein the components of the system are located on a single integrated circuit.

14. The system of claim 13, wherein the system is operably connected to a rechargeable thin film microbattery cell having an effective capacity of no greater than about 500 µAH.

15. The system of claim 14, wherein the system and the rechargeable thin film microbattery cell are configured as a two terminal connection component to be connected to a powered electronic device.

16. A powered electronic device comprising the system of claim 15.

17. The system of claim 14, wherein the system and the rechargeable thin film microbattery cell are configured as a three terminal connection component to be connected to a powered electronic device.

18. A powered electronic device comprising the system of claim 17.

* * * * *